April 14, 1931.  A. L. KLEES ET AL  1,800,352
PRESSURE REGULATOR AND CUT-OFF
Filed May 20, 1929
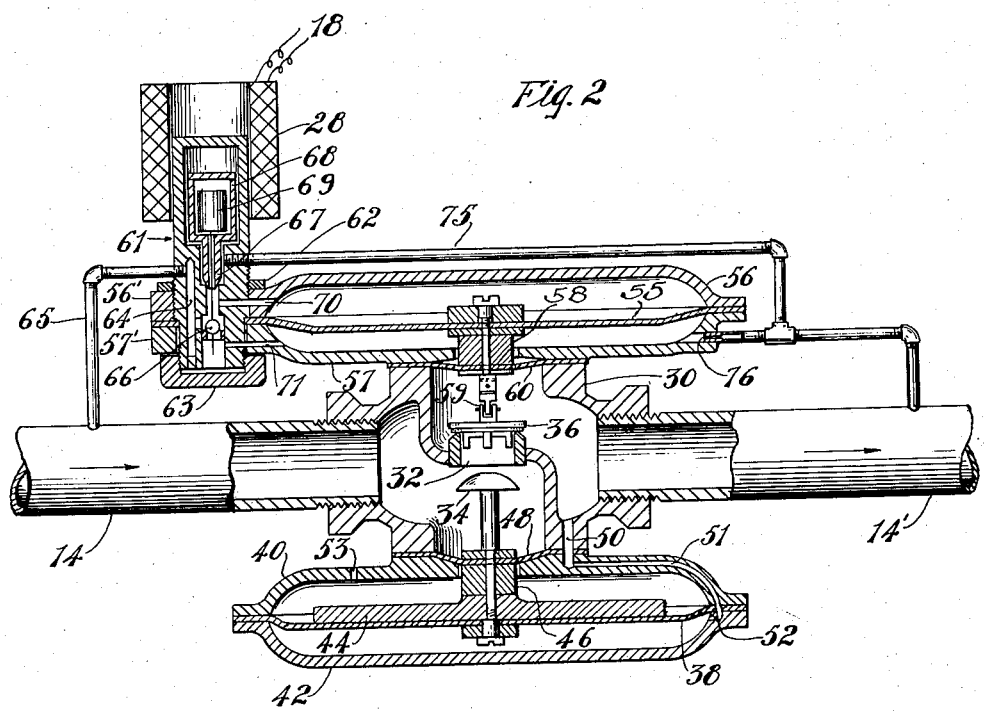
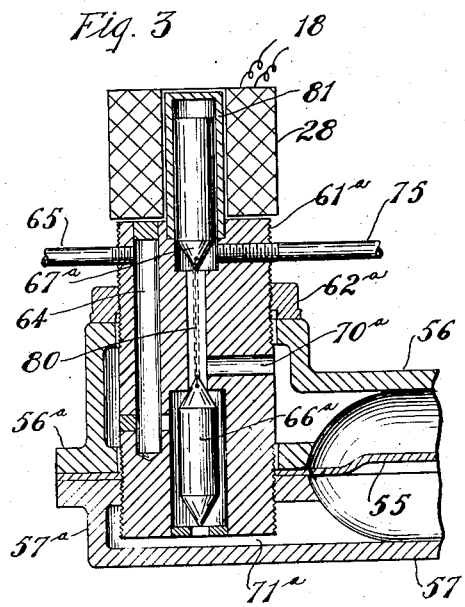
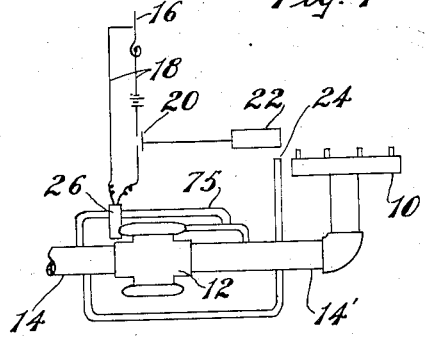
INVENTORS
A. L. KLEES
BENJ. GREENFIELD
BY Charles A. Lind
ATTORNEY Patented Apr. 14, 1931

1,800,352

UNITED STATES PATENT OFFICE

ALBERT L. KLEES, OF LONG BEACH, AND BENJAMIN GREENFIELD, OF JACKSON HEIGHTS, NEW YORK, ASSIGNORS TO SURFACE COMBUSTION CORPORATION, OF TOLEDO, OHIO, A CORPORATION OF NEW YORK

PRESSURE REGULATOR AND CUT-OFF

Application filed May 20, 1929. Serial No. 364,422.

This invention relates to improvements in combined gas regulators and cut-offs, the invention having special utility with thermostatically controlled burners for domestic heating furnaces.

The invention has for its object to combine with a single main valve body a pressure regulator and a cut-off valve, the cut-off valve embodying mechanism permitting remote control thereof as by a room thermostat.

In accordance with this invention there is combined with a valve body having a single valve port, a pressure regulator the valve of which is adapted to seat against the inlet side of said port and a cut-off mechanism the valve of which is adapted to seat against the outlet side of said port, the cut-off valve being connected to a diaphragm adapted to be exposed to the gas pressure at the inlet side of said valve body for positively opening and closing the cut-off valve, the admission of pressure to the diaphragm chamber being controlled by valve mechanism adapted to be controlled from a remote point.

Referring to the drawings wherein the preferred form of the invention is shown, Fig. 1 shows how the combined pressure regulator and cut-off may be combined with a burner and a remote controlling system embodying room and pilot thermostats. Fig. 2 is an enlarged vertical section through the pressure regulator and cut-off; and Fig. 3 an enlarged vertical section of a modified form of magnetically controlled valve mechanism for exposing the cut-off valve diaphragm to the gas main pressure.

In Fig. 1, 10 indicates a gas burner and 12 a combined pressure regulator and cut-off between the burner and the supply main 14. 16 indicates a room thermostat in a circuit 18 which is adapted to be interrupted by a switch 20 controlled by a thermal element 22 adapted to be heated by the pilot burner 24 in such a manner that when the pilot is burning the switch 20 will be maintained in closed position, the circuit 18 being adapted to energize a motor mechanism generally indicated at 26 which motor mechanism preferably takes the form of a solenoid the coil of which is indicated at 28 in Figs. 2 and 3, the solenoid controlling a valve mechanism as hereinafter more fully explained.

Referring now to Fig. 2, 30 indicates the body of a valve chamber or casing having therein a partition wherein is formed a port or passage 32 the inlet side of which is adapted to be closed by a pressure regulator valve 34 and the outlet side by a cut-off valve 36. Valve 34 is movable with a diaphragm 38 confined within a case having top and bottom plates 40 and 42, the plate 40 being secured to the valve body 30 in any suitable manner. Carried by said diaphragm is a weight 44 provided with an extension 46 which projects through a central opening in the plate 40. Suitably secured to the extension 46 and confined between the plat 40 and valve body 30 is a sealing diaphragm 48.

The under side of the diaphragm 38 is in direct communication with the outlet side of valve body 30 by means of a passage the various parts of which are indicated at 50, 51 and 52. The upper side of the diaphragm is open to the atmosphere through a small port 53 in the upper plate 40 of the diaphragm case.

It will now be readily understood that in the absence of sufficient pressure below the diaphragm 38 to lift the parts carried by the diaphragm the valve 34 will remain open under the influence of gravity and gas will flow through the valve body 30 provided the valve 36 is open and that when the outlet pressure reaches a certain pressure determined by the load on the diaphragm the valve 34 will close.

The cut-off valve 36 is movable with a diaphragm 55 which is confined within a case having top and bottom plates 56 and 57. The connections between the valve 36 and its diaphragm includes a cylindrical body 58 which projects through a central opening in the plate 57 and a flexible joint 59. A flexible member 60 provides a gas tight seal between the diaphragm 55 and its valve 36. The valve 36 and other parts carried by the diaphragm 55 are made as light as possible so that very little pressure on the under side of said diaphragm will suffice to move it upwardly and hence to lift the valve 36 from its seat.

The rim of the case plates 56 and 57 is extended as indicated at 56' and 57' and perforated to receive a ported cylindrical body generally indicated at 61. A threaded collar 62 on the body rests on the extension 56' and a cap 63 on the lower end of the body abutting the extension 57' serves to rigidly secure said body in place.

Formed within the body 61 is a supply port 64 which is in connection with the high pressure gas main 14 by a pipe connection 65, said port opening into a central distributing port which is controlled by a double beat ball valve 66 and a simple valve 67 the latter being formed as an extension of a hollow iron body 68 wherein is contained displaceable cylinder 69 of brass or other non-magnetic material the ball valve 66 being suspended from said cylinder by a relatively stiff wire which passes through a central passage in the stem of the valve 67. A lateral port 70 between the seat of the valve 67 and the upper seat of the ball valve 66 establishes communication between the central distributing port and the upper side of the diaphragm 55 and a lateral port 71 below the lower seat of the ball valve 66 establishes communication between said distributing port and the underside of said diaphragm.

When the valve 66 and 67 are in the position shown, gas under pressure from gas main 14 is effective on the top side of the diaphragm 55 and consequently the cut-off valve 36 is held to its seat. There is sufficient clearance between the cut-off valve 36 and the regulator valve 34 to permit both valves to be at their seats at the same time. It will, however, be appreciated that the regulator of which the diaphragm 38 forms a part will cease to function when valve 36 is at its seat.

When valve 67 is raised from its seat, the ball valve 66 will be raised from its lower seat and will be brought to its upper seat, formed by a shoulder in the central distributing port, by reason of its being connected by a wire to the cylinder 69.

The length of the wire which connects the ball valve 66 to the brass cylinder 69 is such that when the valve 67 is seated the bottom of said cylinder will be clear of the bottom of the chamber formed in the valve body 68 thereby permitting the weight of the cylinder 69 to hold the ball valve to its lower seat.

When the ball valve 66 is at its upper seat, gas under pressure from the supply main 14 is effective on the under side of the diaphragm 55, to the exclusion of such pressure on the upper side of said diaphragm. The cut-off valve 36 will therefore be lifted from its seat whereupon the pressure regulator of which the diaphragm 38 forms a part will begin to function as will now be readily understood. When the valve 67 is lifted from its seat, the upper side of diaphragm 55 is relieved in any suitable manner of the gas pressure previously effective thereon. As shown, relief from such pressure may be had by way of port 70 and a pipe 75 in communication therewith around the valve 67, the pipe preferably discharging into the low pressure supply pipe 14 on the delivery side of the main valve body 30. A bleed port 76 in the diaphragm case plate 57 tends continually to exhaust the pressure effective under the diaphragm 55 and consequently to permit the valve 36 to seat when the gas main pressure is too low to overcome the effect of the bleed port. This bleed port preferably discharges into the burner supply pipe 14' as shown.

The solenoid coil 28 which surrounds the upper portion of the body 61 serves to lift the iron body 68 of which the valve 67 forms a part and also the ball valve 66 from its lower to its upper seat as will now be readily understood. As previously stated the solenoid coil circuit includes a room thermostat 16 and a pilot-light controlled switch 20. If the switch 20 is open the coil 28 cannot be energized even though the thermostat should call for heat as will now be readily understood.

In Fig. 3 is shown a modified form of valve construction for controlling the admission of gas pressure to the cut-off valve diaphragm 55, the case plates 56 and 57 having lateral extensions 56a and 57a, respectively, forming a housing whereinto the ported valve body 61a projects the lower end thereof being screw threaded into the extension 57a, a collar 62a on said body seating against the extension 56a. Instead of a ball valve as in Fig. 2 there is provided a cylinder 66a pointed at both ends which is suspended by a flexible connection 80 from the upper valve 67a which in this case is a solid iron cylinder movable within a tubular extension 81 of the body 61a, the coil 28 when energized serving to lift the valve 67a and hence also the valve 66a as will be readily understood. Feed ports 70a and 71a correspond to feed ports 70 and 71 respectively in Fig. 2. The operation of the modified valve construction is substantially the same as that shown in Fig. 2 and will be readily understood without further explanation. It may be well to state that in Fig. 3 the solenoid is assumed to be energized while in Fig. 2 it is not. In other words, in Fig. 3 the parts are shown in position to admit fluid pressure to the underside of the diaphragm 55, whereas in Fig. 2 the parts are in position to admit fluid pressure to the upper side of said diaphragm.

As previously stated the weight carried by the cut-off valve diaphragm 55 is kept at a minimum by making the valve 36 and the means which connect it to the diaphragm as light as possible. The diaphragm 55 will therefore be able to open or lift the valve 36 at gas service pressure well below any gas pressure that could satisfactorily operate the gas burner 10 without back-fire. When the solenoid coil 28 is deenergized, gas service pressure is admitted to the top of the diaphragm 55 and the cut-off valve 36 is therefore positively held to its seat with a pressure exactly proportional to the gas service pressure. Except when the cut-off valve 36 is closed, the pressure regulator obviously functions without interference by the other parts secured to the main valve body 30. It will be noted that the solenoid circuit is so arranged that should the pilot burner 24 be extinguished the switch 20 will break the circuit 18 and hence the flow of gas to the burner 10 through the main valve body 30 will be cut-off.

While a solenoid-actuated valve mechanism for controlling the admission of gas service pressure to the cut-off valve diaphragm 55 is preferred because of its relative simplicity nevertheless it is within the spirit of the invention to utilize other motor mechanism for accomplishing the same result.

What is claimed is:

1. In combination, a gas burner, a gas main for supplying gas to the burner, a pressure regulator between said main and burner, a cut-off valve axially alined with the regulator valve and normally tending to render the regulator non-operative, a diaphragm adapted to be actuated by gas main pressure, means coupling the cut-off valve and diaphragm for simultaneous movement, and valve mechanism actuable to expose one side or the other of the diaphragm to gas main pressure.

2. The combination with a fluid-supply conduit and a cut-off valve in the conduit, of means movable by fluid pressure and coupled to said valve to permit the valve to be moved as said means is moved, valve mechanism normally admitting fluid pressure effective in the conduit at the inlet side of said valve to said means in a manner to effect closing of valve, said valve mechanism being operable to direct said fluid pressure to said means in a manner to effect opening of said valve, and means continuously tending to relieve the fluid pressure admitted to the valve-opening side of said means whereby unless such pressure be in excess of a predetermined pressure the valve will remain closed.

3. The combination with a fluid-supply conduit and a cut-off valve in the conduit, of a diaphragm coupled to said valve for opening and closing it, valve mechanism normally admitting fluid pressure effective in the conduit at the supply side of said valve to one side of the diaphragm for holding said valve to its seat, said mechanism being operable to direct said pressure to the other side of said diaphragm to effect opening of said valve, and means continuously tending to relieve the fluid pressure admitted to the valve-opening side of said diaphragm whereby unless such pressure be in excess of a predetermined pressure to the valve will remain closed.

4. The combination with a fluid-supply conduit and a cut-off valve in the conduit, of means normally subject to fluid pressure effective in said conduit at the supply side of said valve for holding said valve to its seat with a pressure proportional to said fluid pressure, means operable to make said fluid pressure effective on said means in a manner to open said valve, and means continuously tending to relieve the fluid pressure admitted to the valve-opening side of said means whereby unless such pressure be in excess of a predetermined pressure the valve will remain closed.

5. The combination with a fluid-supply conduit and a cut-off valve in the conduit, of a diaphragm coupled to said valve and normally subject on one side to fluid pressure effective in said conduit at the inlet side of said valve for holding said valve to its seat with a pressure proportional to said fluid pressure, means operable to make said fluid pressure effective on the other side of said diaphragm to open said valve, and means continuously tending to relieve the fluid pressure admitted to the valve-opening side of said diaphragm whereby unless such pressure be in excess of a predetermined pressure the valve will remain closed.

6. In combination, a fluid-supply conduit, a valve in the conduit adapted to open and close the flow path therethrough, means movable by fluid pressure and coupled to said valve to permit the valve to be moved as said means is moved, a pressure regulator subject to pressure at the discharge side of said valve and adapted to close said flow path at the fluid-inlet side of said valve, and means adapted to make fluid pressure effective at the inlet side of said valve effective at all times on said means in a manner tending either to open or close said valve.

7. In combination, a fluid-supply conduit, an apertured partition in said conduit, a valve adapted to open and close the flow path through said partition, a diaphragm coupled to said valve, means for admitting fluid pressure from the inlet side of said valve to one side or the other of said diaphragm, and a pressure regulator subject to fluid pressure at the outlet side of said valve and adapted to close the flow path through said partition.

8. In combination, a fluid-supply conduit, an apertured partition in said conduit, a valve adapted to close said aperture at the inlet side thereof, a diaphragm coupled to said valve and subject to fluid pressure at the outlet side of said aperture, a cut-off valve adapted to close said aperture at the outlet side thereof, a diaphragm coupled to said cut-off valve, and means for admitting fluid pressure effective at the inlet side of said aperture to one side of the other of the last mentioned diaphragm.

9. In combination, a fluid-supply conduit, an apertured partition in said conduit, a valve adapted to close said aperture at the inlet side thereof, a diaphragm coupled to said valve and subject to fluid pressure at the outlet side of said aperture, a cut-off valve adapted to close said aperture at the outlet side thereof, a diaphragm coupled to said cut-off valve, means for admitting fluid pressure effective at the inlet side of said aperture to one side or the other of the last mentioned diaphragm, and a bleed port tending to releave the fluid pressure which when admitted to one side of the cut-off valve diaphragm tends to remove the cut-off valve from its seat.

10. In combination, a gas burner, a conduit for supplying gas to the burner, a cut-off valve in said conduit, a diaphragm coupled to said valve, valve mechanism normally establishing open communication between one side of said diaphragm and the inlet side of said valve and actuable to establish such communication with the other side of the diaphragm, the gas pressure normally effective on the diaphragm tending to hold the valve to its seat and when made effective on the other side of the diaphragm tending to open said valve, and means continuously tending to relieve the gas pressure admitted to the valve-opening side of the diaphragm whereby unless the gas pressure be in excess of a predetermined minimum the valve will automatically close.

In testimony whereof we affix our signatures.

ALBERT L. KLEES.
BENJAMIN GREENFIELD.